United States Patent
Okano

(10) Patent No.: US 7,124,086 B2
(45) Date of Patent: Oct. 17, 2006

(54) DATA REPRODUCING APPARATUS AND DATA REPRODUCING SYSTEM FOR REPRODUCING CONTENTS STORED ON A REMOVABLE RECORDING MEDIUM

(75) Inventor: Hideo Okano, Hanno (JP)

(73) Assignee: Olympus Corporation, Tokyo (JP)

( * ) Notice: Subject to any disclaimer, the term of this patent is extended or adjusted under 35 U.S.C. 154(b) by 839 days.

(21) Appl. No.: 10/157,274

(22) Filed: May 29, 2002

(65) Prior Publication Data

US 2002/0184040 A1 Dec. 5, 2002

(30) Foreign Application Priority Data

May 30, 2001 (JP) ............................. 2001-163391
May 30, 2001 (JP) ............................. 2001-163392

(51) Int. Cl.
*G10L 19/14* (2006.01)
(52) U.S. Cl. .................... 704/500; 704/200; 710/68; 717/174
(58) Field of Classification Search ................... None
See application file for complete search history.

(56) References Cited

U.S. PATENT DOCUMENTS

| | | | | |
|---|---|---|---|---|
| 5,838,996 A | * | 11/1998 | deCarmo | 710/68 |
| 6,570,926 B1 | * | 5/2003 | Agrawal et al. | 375/240.27 |
| 6,601,139 B1 | * | 7/2003 | Suzuki | 711/115 |
| 6,904,406 B1 | * | 6/2005 | Yamaji | 704/501 |
| 2002/0046216 A1 | * | 4/2002 | Yamazaki et al. | 707/201 |

* cited by examiner

*Primary Examiner*—Donald L. Storm
(74) *Attorney, Agent, or Firm*—Straub & Pokotylo; John C. Pokotylo

(57) ABSTRACT

A data reproducing apparatus according to the present invention enables a recorder to rewrite recorded contents of a memory card. A digital signal processing section (DSP) detects a compression system for compressed data recorded in the memory card. A central processing unit (CPU) detects whether or not the memory card records a decoding file corresponding to the detected compression system. When such decoding file is not detected, internal memory stores data indicating the undetected decoding file.

6 Claims, 13 Drawing Sheets

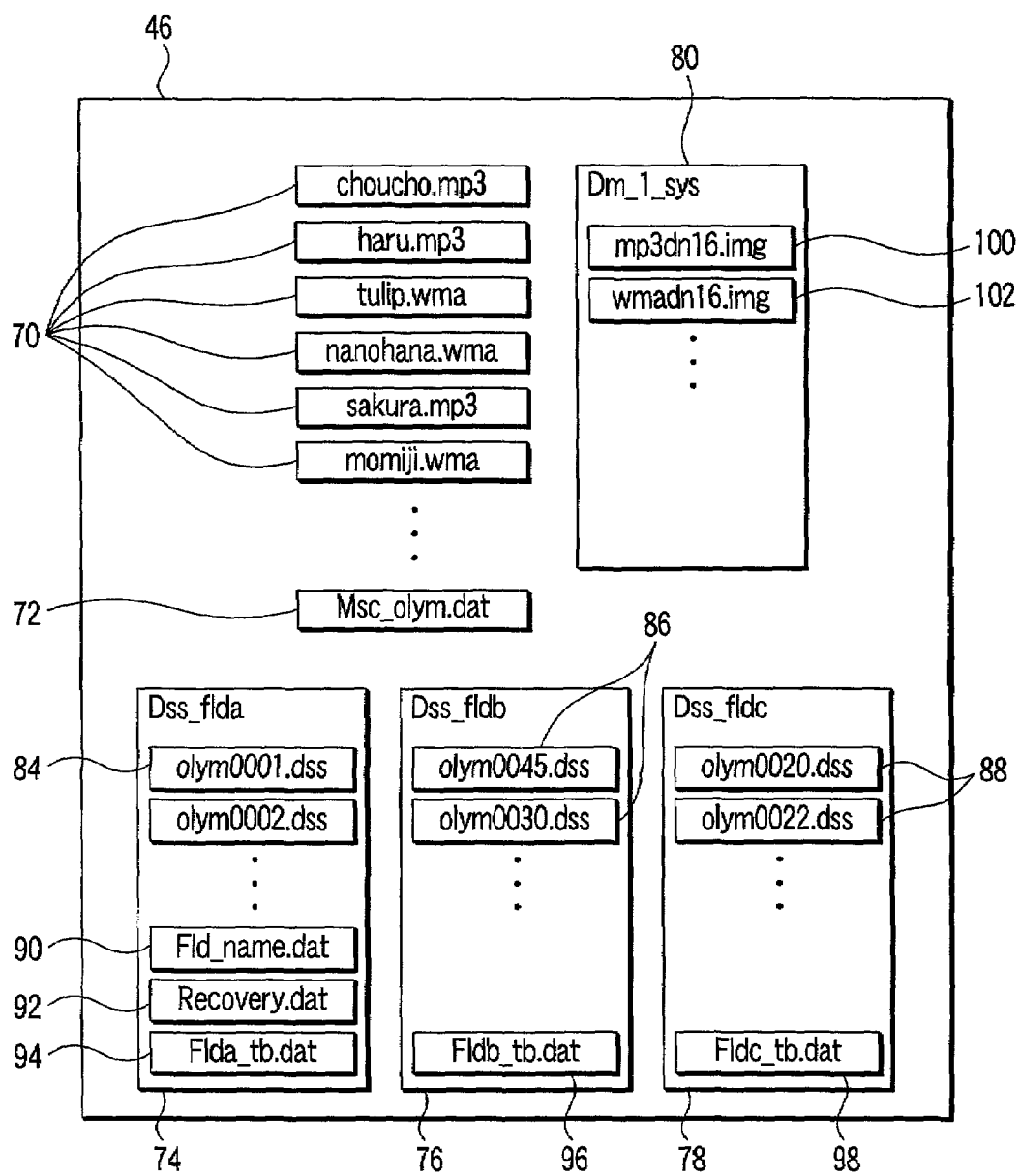
F I G. 2

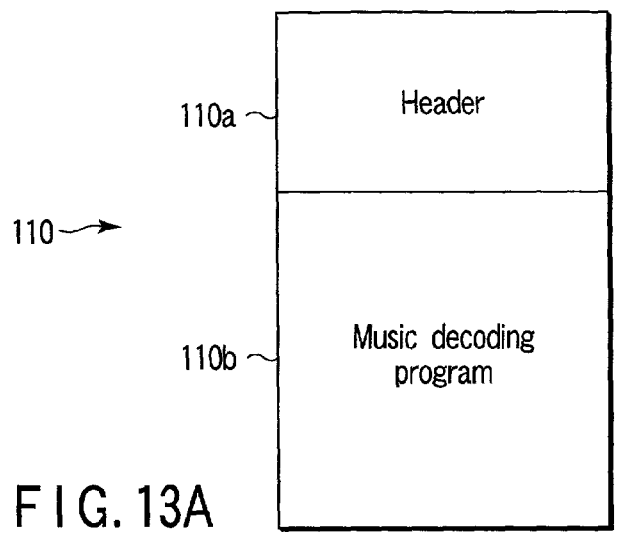

FIG. 13A

| Item | Address | Bytes | Content |
|---|---|---|---|
| 1 | 0x0000-0x0001 | 2 | Identification of company number<br>Unavailable : 0xFFFF<br>Information available : 0x0000 |
| 2 | 0x0002-0x0005 | 4 | Relevant product<br>DM-1 0x00000001 |
| 3 | 0x0006-0x0007 | 2 | Major version information<br>(CPU support, incremental version)<br>0x0001 |
| 4 | 0x0008-0x0009 | 2 | Minor version information<br>(image file information, incremental version)<br>0x0001 |
| 5 | 0x000A-0x000D | 4 | Image file size<br>128kbytes : 0x00020000<br>256kbytes : 0x00040000 |
| 6 | 0x000E-0x002D | 32 | Creator (company) name in ASCII<br>000000 OPTICAL |
| 7 | 0x002E-0x0035 | 8 | Manufacturing date in ASCII<br>20010316 |
| 8 | 0x0036-0x005F | 42 | Reserved (filled with 0xFF) |

FIG. 13B

DATA REPRODUCING APPARATUS AND DATA REPRODUCING SYSTEM FOR REPRODUCING CONTENTS STORED ON A REMOVABLE RECORDING MEDIUM

CROSS-REFERENCE TO RELATED APPLICATIONS

This application is based upon and claims the benefit of priority from the prior Japanese Patent Applications No. 2001-163391, filed May 30, 2001; and No. 2001-163392, filed May 30, 2001, the entire contents of both of which are incorporated herein by reference.

BACKGROUND OF THE INVENTION

1. Field of the Invention

The present invention relates to a portable electronic device and more particularly to a data reproducing apparatus, a data processing apparatus, and a data transfer system capable of outputting voice signals.

2. Description of the Related Art

In recent years, there is commercialized a voice recording/reproducing apparatus having a reproducing-only mode (player mode) and a recording/reproducing mode (voice memo mode or recorder mode) as operation modes. The reproducing-only mode can reproduce music data distributed from a pay database, etc. The recording/reproducing mode can record voice data on internal memory and reproduce it.

There is known a data reproducing apparatus which compresses and digitizes music or voice information, stores this information as data in a personal computer, and records the data on removable memory. The removable memory can be mounted on a portable electronic device for reproduction and reproducing the desired music or voice information.

Such data reproducing apparatus need not previously record a program for expanding compressed data on a portable electronic device. There is provided a method of reading a program for expanding compressed data into a digital signal processing section during reproduction, operating the digital signal processing section, and then reading the recorded data for reproduction.

However, before reproduction, the above-mentioned data reproducing apparatus requires a user to check whether or not the transferred data records a decompression program capable of reproducing desired music or voice.

Such apparatus is not easy to use because a user can check whether or not the removable memory contains that decompression program only during reproduction.

In addition, when the removable memory does not contain the decompression program as a check result, the user must transfer the decompression program from the personal computer to the data reproducing apparatus. This is another user unfriendly aspect of the apparatus.

BRIEF SUMMARY OF THE INVENTION

It is therefore an object of the present invention to provide a data reproducing apparatus, a data processing apparatus, and a data transfer system capable of reproducing music or voice information when memory is connected and such information is transferred to the memory.

It is another object of the present invention to provide a data reproducing apparatus which, when memory is connected, facilitates confirmation whether or not intended music or voice information can be reproduced.

A first object of the present invention is to provide a data reproducing apparatus comprising:

a recording medium whose recording contents can be rewritten by an external device;

a compression system detection section which detects a compression system for compressed data recorded on the recording medium;

a decoding file detection section which detects whether or not the recording medium records a decoding file corresponding to the detected compression system; and a storage section which, when the decoding file is not detected, stores data indicating the undetected decoding file.

A second object of the present invention is to provide a data processing apparatus capable of sending and receiving data from a data reproducing apparatus which reproduces compressed data recorded on a recording medium by using a corresponding decoding file, the data processing apparatus comprising:

a detection section which detects connection of the data reproducing apparatus;

an information acquisition section which obtains information about a decoding file needed to reproduce the compressed data from the data reproducing apparatus in response to connection with the data reproducing apparatus; and a transmission section which transmits a necessary decoding file based on the obtained information to the data reproducing apparatus.

A third object of the present invention is to provide a data transfer system including a data reproducing apparatus and a data processing apparatus, wherein the data reproducing apparatus comprising:

a recording medium whose recording contents can be rewritten by an external device;

a compression system detection section which detects a compression system for compressed data recorded on the recording medium;

a decoding file detection section which detects whether or not the recording medium records a decoding file corresponding to the detected compression system;

a storage section which, when the decoding file is not detected, stores data indicating the undetected decoding file;

a connection section which connects with the external device; and a first control section which provides control to record a decoding file transferred from the external device on the recording medium in response to connection with the external device and based on the data stored in the storage section, and wherein the data processing apparatus capable of sending and receiving data from a data reproducing apparatus which reproduces compressed data recorded on a recording medium by using a corresponding decoding file, the data processing apparatus comprising:

a detection section which detects connection of the data reproducing apparatus;

an information acquisition section which obtains information about a decoding file needed to reproduce the compressed data from the data reproducing apparatus in response to connection with the data reproducing apparatus;

a transmission section which transmits a necessary decoding file based on the obtained information to the data reproducing apparatus; and a second control section which controls the data reproducing apparatus so as to record a decoding file transmitted by the transmission section on the recording medium.

A fourth object of the present invention is to provide a data reproducing apparatus comprising:

a mounting section which mounts a attachable/detachable recording medium;

a recording medium detection section which detects installation of the recording medium;

a compression system detection section which detects a compression system for compressed data recorded on the recording medium when the recording medium is mounted;

a decoding program detection section which detects whether or not the recording medium records a decoding program corresponding to the detected compression system; and a warning section which generates an alarm when the decoding program is not detected.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2 is a block diagram illustrating how data is recorded on a memory card 46 used in the voice recording/reproducing apparatus according to the first embodiment of the present invention;

FIGS. 13A and 13B describes decoding file management specifications.

DETAILED DESCRIPTION OF THE INVENTION

Embodiments of the present invention will be described in further detail with reference to the accompanying drawings. A voice recording/reproducing apparatus represented as an example has a capability of recording and reproducing a dictation memo and a capability of recording and reproducing a music file by communicating with a personal computer. Semiconductor memory is used as a storage medium.

Figure 1:
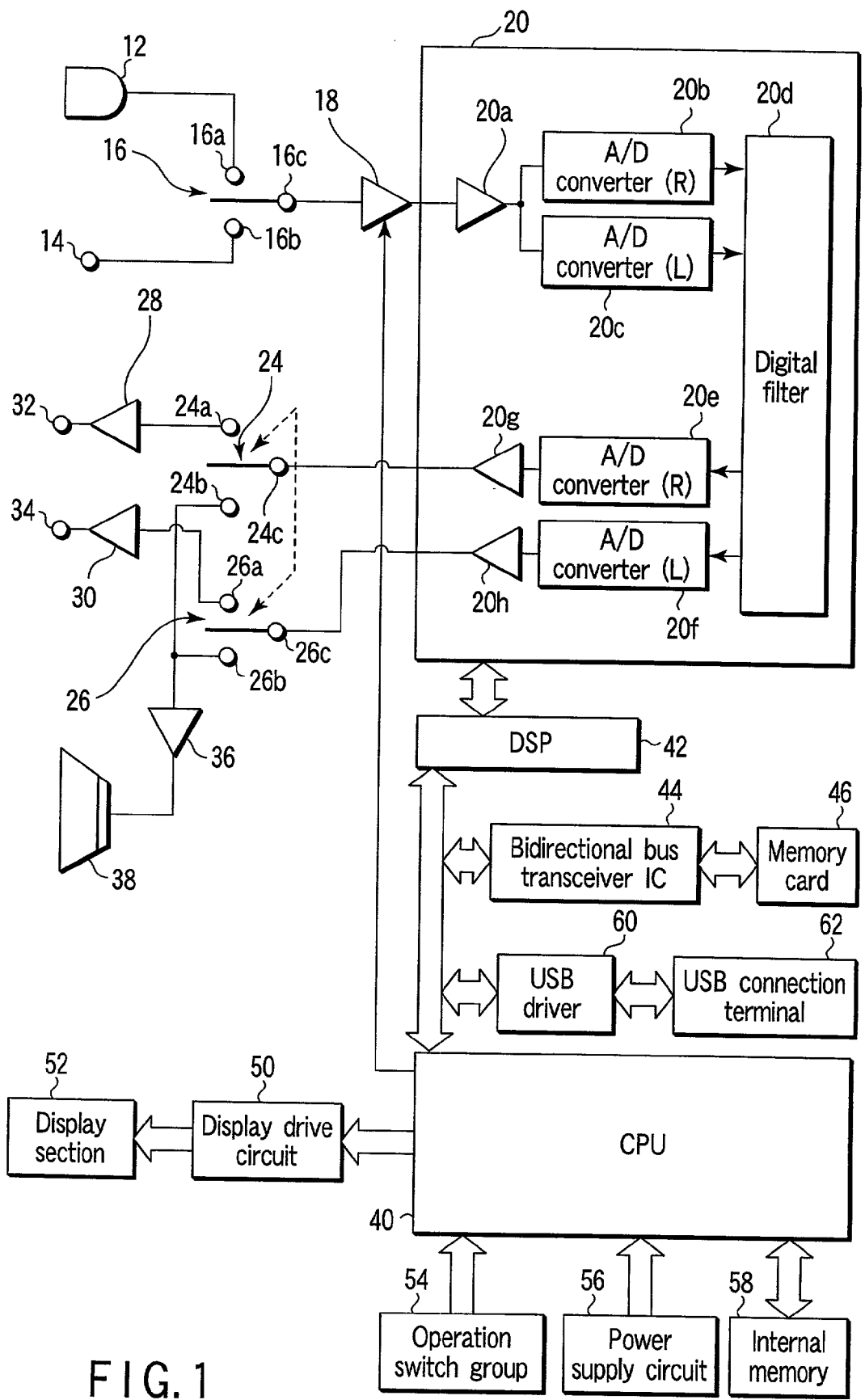
FIG. 1 is a block diagram showing a configuration of a voice recording/reproducing apparatus according to a first embodiment of the present invention.

FIG. 1 is a block diagram showing a configuration of a voice recording/reproducing apparatus according to a first embodiment of the present invention.

First described are parts in a voice recording system.

As shown in FIG. 1, the voice recording/reproducing apparatus comprises a microphone 12 and a line-in terminal 14. The microphone 12 converts voice to an electric signal. The line-in terminal 14 is used as a microphone jack for inputting a voice signal from an external apparatus such as an external microphone, etc. An input switch (SW) 16 comprises terminals 16a, 16b, and 16c, and selects the microphone 12 or the line-in terminal 14 to be used.

According to the embodiment, a single monaural voice channel is used for input to the microphone 12 and the line-in terminal 14.

A voice signal selected by the input switch 16 is input to a preamplifier 18 and is amplified there. The voice signal amplified in the preamplifier 18 is input to an input amplifier 20a of a stereo codec 20 which converts a voice signal to a digital signal, and vice versa.

The stereo codec 20 comprises an input amplifier 20a, an A/D converter (R) 20b, an A/D converter (L) 20c, a digital filter 20d, a D/A converter (R) 20e, a D/A converter (L) 20f, an output amplifier (R) 20g, and an output amplifier (L) 20h.

When input to the input amplifier 20a, the voice signal is re-amplified here, and then is input to the A/D converter (R) 20b and the A/D converter (L) 20c. These converters convert the analog voice signal to a digital signal. The converted digital signal is input to the digital filter 20d.

The digital filter 20d eliminates an unnecessary quantization noise called an aliasing noise from the digital voice signal. This noise occurs when the voice signal is converted to a digital voice signal. When the quantization noise is eliminated, the digital voice signal is transferred to a digital signal processing section (hereafter abbreviated as a DSP) 42. Under control of a CPU 40, the DSP 42 encodes (compresses and converts) the input digital voice signal according to a specified format in units of frames to generate coded data.

The voice recording/reproducing apparatus uses a coding system called the Digital Speech Standard (hereafter abbreviated as a DSS). The DSS format supports two recording modes: standard mode (SP) and long mode (LP). The SP mode provides relatively high sound quality. The LP mode enables high compressibility and is suitable for long recording with slightly degraded sound quality.

The generated coded data is transferred to a bidirectional bus transceiver IC 44, then to a memory card 46 as a coded data recording section. The memory card 46 is configured as card-shaped semiconductor memory such as flash memory etc. which can be attached to or detached from the voice recording/reproducing apparatus. The memory card 46 is available as Smart Media (registered trademark), for example. The voice recording/reproducing apparatus according to the present invention uses Smart Media.

The coded data is sequentially written to specified addresses in the memory card 46 under control of the CPU 40 via the bidirectional bus transceiver IC 44. The coded data written in the memory card 46 is handled on a file basis. A DSS-coded data file is hereafter referred to as a DSS file.

The voice recording/reproducing apparatus records a voice monaurally. The memory card 46 records only coded data for a digital voice signal output from the A/D converter (R) 20*b*.

Parts of a reproducing system will be described hereinafter according to a flow of signals for reproducing coded data recorded in the memory card 46.

The coded data is sequentially transferred from the memory card 46 to the DSP 42. The coded data transferred to the DSP 42 is decoded (decompressed and converted) to a digital voice signal in units of specified frames under control of the CPU 40. As will be described later, the memory card 46 can record coded data other than DSS files. Accordingly, the DSP 42 determines which encoding is used for the coded data sent from the memory card 46. The coded data is decoded according to that encoding.

Here, the voice recording/reproducing apparatus according to the embodiment is assumed to be capable of three decoding systems: Windows Media (registered trademark) of Microsoft (registered trademark), Motion Picture Experts Group-1 Audio Layer 3, and DSS. The Windows Media system is hereafter abbreviated as the WMA system. Its coded data file is represented as a WMA file. The Motion Picture Experts Group-1 Audio Layer 3 is hereafter abbreviated as the MP3 system. Its coded data file is represented as an MP3 file.

The decoded digital voice signal is transferred to the stereo codec 20. A digital filter 20*d* in the stereo codec 20 eliminates a quantization noise from the transferred digital voice signal. The D/A converter (R) 20*e* and the D/A converter (L) 20*f* convert the digital voice signal to an analog voice signal for right and left channels, respectively. The converted signal is amplified in the output amplifier (R) 20*g* and the output amplifier (L) 20*h* and is output from the stereo codec 20. When the original coded data is monaural, the same signal is input to the right and left channels, and then is processed for output.

The stereo codec 20 outputs voice signals for the right and left channels. Interlocking output switches 24 and 26 specify output destinations of the signals. The output switch 24 comprises terminals 24*a*, 24*b*, and 24*c*. The output switch 26 comprises terminals 26*a*, 26*b*, and 26*c*.

As output destinations of the voice signal, there are provided headphone terminals (R) 32 and (L) 34 and a speaker 38. The headphone terminals 32 and 34 are used to connect with an external headphone etc. (not shown) and reproduce a voice signal by using an external reproduction device. The speaker 38 is provided on the voice recording/reproducing apparatus and functions via a speaker amplifier 36.

The CPU 40 connects with some circuits etc. in addition to the above-mentioned blocks. A display section 52 is connected to the CPU 40 via a display drive circuit 50. Further, the CPU 40 connects with an operation switch group 54, a power supply circuit 56, internal memory 58, the DSP 42, the bidirectional bus transceiver IC 44, a USB connection terminal 62 via a USB driver 60.

The display section 52 comprises a two-color LED and a liquid crystal display having a backlight and displays operational states etc. of the voice recording/reproducing apparatus. The display drive circuit 50 drives the display section 52 under control of the CPU 40.

The operation switch group 54, including a recording button, a reproducing button, a fast forward button, a fast backward button, a folder/repeat button, an index/equalizer button, a menu button, a delete button and a stop button, is provided outside the voice recording/reproducing apparatus and controls various functions. The power supply circuit 56 supplies power to drive the voice recording/reproducing apparatus. The power supply circuit 56 contains power control circuits (not shown) such as a battery, a battery check circuit, a power-on reset circuit, step-up transformer circuit, a step-down transformer circuit, an external power supply connection circuit, etc.

The internal memory 58 comprises EEPROM, i.e., rewritable nonvolatile memory built in the apparatus. The internal memory 58 stores various settings, parameters, etc. to be recorded when no power is supplied to the CPU 20 such as a user ID, selection of the recording mode (standard or long), selection of the beep sound (ON/OFF), locations of data to be reproduced, etc.

The voice recording/reproducing apparatus can be connected to external devices such as a personal computer, etc. The voice recording/reproducing apparatus is capable of various processing by means of bidirectional communication with external devices connected.

As such processing, for example, the apparatus transfers a coded data file recorded on a hard disk in the personal computer to the memory card 46. Adversely, the apparatus transfers a coded data file recorded in the memory card 46 to a recording medium in the personal computer. As another example, the stereo codec 20 converts a voice signal input from the microphone 12 to a digital voice signal. Coded data processed in the DSP 42 is directly recorded on a recording medium in the personal computer.

For communication with external devices such as the above-mentioned personal computer etc., the voice recording/reproducing apparatus according to the embodiment is configured to use an interface called the Universal Serial Bus (hereafter abbreviated as USB) for connection with external devices. The USB connection terminal 62 is an external connection terminal for connection with a USB cable. The USB connection terminal 62 is controlled by a USB driver 60 as a communication driver and is connected to the CPU 40 via an internal bus.

The following describes operation modes of the voice recording/reproducing apparatus.

The voice recording/reproducing apparatus provides two operation modes. A first mode is referred to as a recorder mode capable of recording and reproducing a voice input from the microphone or the microphone jack (line-in terminal). A second mode is referred to as a player mode only for reproducing a coded data file recorded on a recording medium, not for recording.

In the voice recording/reproducing apparatus according to the embodiment, the recorder mode is mainly used for a message memo, dictation, recording of a meeting, etc. The DSS encoding is used because it is suitable for high compressibility and long recording. The player mode is chiefly intended for music listening and uses the WMA and MP3 encoding capable of high-quality reproduction.

Referring now to FIG. 2, the following describes how data is recorded on the memory card 46 used for the voice recording/reproducing apparatus.

For a route of the memory card 46, there are provided a coded data file 70, a song sequence data file 72, DSS file folders 74, 76, and 78, and a system folder 80.

The coded data file 70 uses "mp3" or "wma" as a file extension, indicating an MP3 or WMA encoded music data file. An mp3 or wma file is a coded data file reproducible in the player mode.

The song sequence data file 72 stores table data for maintaining an order of coded data files to be reproduced in the player mode. It is possible to change the order of coded data files to be reproduced in the player mode by modifying the song sequence data file 72 under control of the CPU 40.

The DSS file folders 74, 76, and 78 store DSS files. In the recorder mode, there are provided three folders A, B, and C for organizing DSS files. The DSS file folders 74, 76, and 78 correspond to the folders A, B, and C, respectively.

The DSS file folders 74, 76, and 78 store DSS files 84, 86, and 88, respectively. The DSS files 84, 86, and 88 are reproducible in the recorder mode. During recording, a DSS file is created in any of the DSS file folders 74, 76, and 78. The reproduction order of the DSS files 84, 86, and 88 is recorded as table data in reproduction sequence data files 94, 96, and 98 corresponding to the folders.

In consideration of the capability of the display section 52 and user-friendliness, the voice recording/reproducing apparatus according to the embodiment specifies up to 199 recordable files per folder in the recorder mode and 597 files in total.

The DSS file folder 74 contains a folder name data file 90 and a recovery data file 92 in addition to the above-mentioned files. The voice recording/reproducing apparatus allows the folders A, B, and C to be changed to any names displayed on the display section 52. The folder name data file 90 records data for maintaining correspondence among the display names and the DSS file folders 74, 76, and 78.

The recovery data file 92 stores data for recovering data which is contained in the DSS file folders 74, 76, and 78 and is destroyed for some reasons.

The system folder 80 stores decoding files 100 and 102 for coded data files to be reproduced in the player mode. Each of the decoding file 100 and 102 has a filename whose first three characters use an extension of the corresponding coded data file. The decoding file extension is "img". A decoding file used in the recorder mode is stored in ROM (not shown) in the CPU 40.

Referring now to flowcharts in FIGS. 3 through 7, the following describes operations of the voice recording/reproducing apparatus according to the embodiment.

Figure 3:
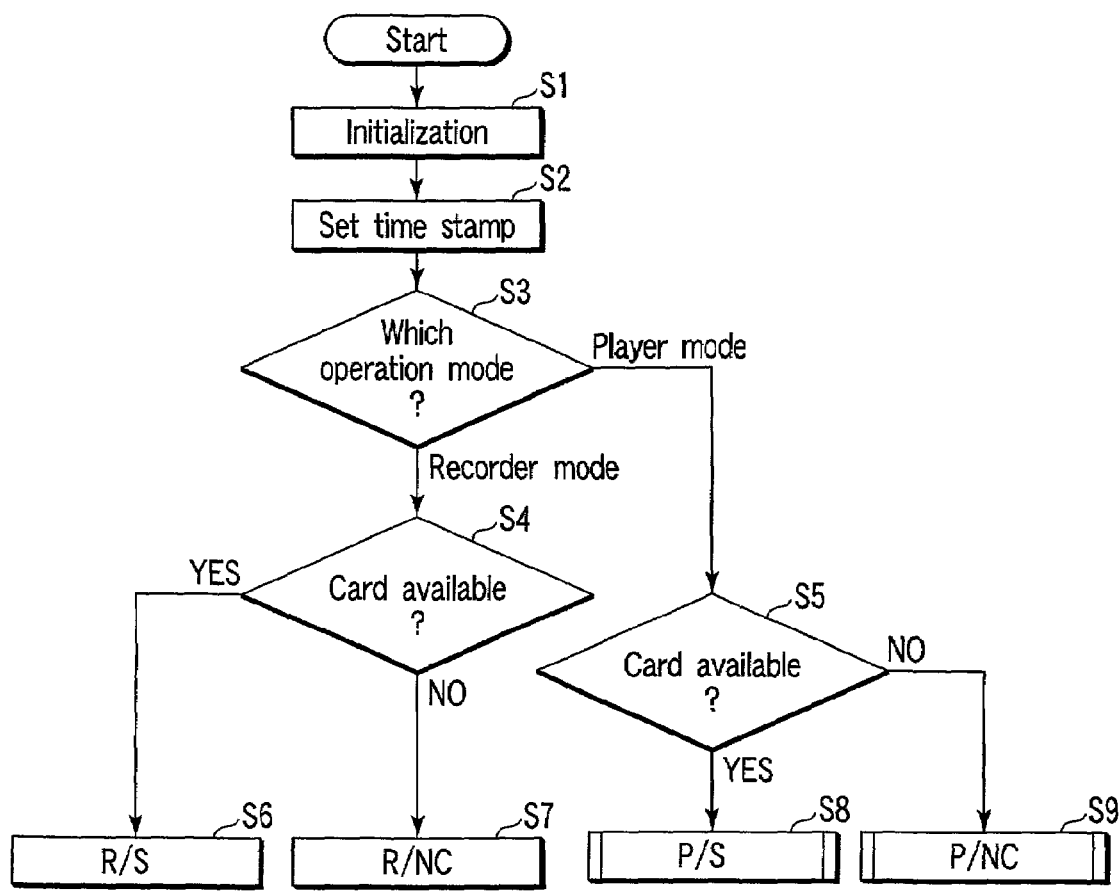
FIG. 3 is a flowchart which shows a main operation of the voice recording/reproducing apparatus according to the first embodiment of the present invention.

FIG. 3 is a flowchart which shows a main operation of the voice recording/reproducing apparatus according to the first embodiment of the present invention.

An operation starts when the power is supplied to each circuit, e.g., when a battery is loaded. At step S1, the initialization is performed to clear the memory, set various parameters, reset the hardware, etc. At step S2, the current time stamp is set.

At step S3, it is determined whether the recorder mode or the player mode is enabled. Specifically, the CPU 40 detects to which mode an operation mode switch (not shown) is set. When the recorder mode is enabled, the process proceeds to step S4. When the player mode is enabled, the process proceeds to step S5.

At step S4, it is determined whether or not the memory card 46 is mounted on the apparatus. When the memory card 46 is mounted on the apparatus, the process proceeds to step S6 to perform an R/S (recorder mode/stop) process. When the memory card 46 is not mounted on the apparatus, the process proceeds to step S7 to perform an R/NC (recorder mode/no card) process.

When the player mode is enabled, it is determined at step S5 whether or not the memory card 46 is mounted on the apparatus. When the memory card 46 is mounted on the apparatus, the process proceeds to step S8 to perform a P/S (player mode/stop) process. When the memory card 46 is not mounted on the apparatus, the process proceeds to step S9 to perform a P/NC (player mode/no card) process.

An appropriate process is performed depending on which operation mode is enabled and whether or not the memory card 46 is mounted on the voice recording/reproducing apparatus.

Figure 4:
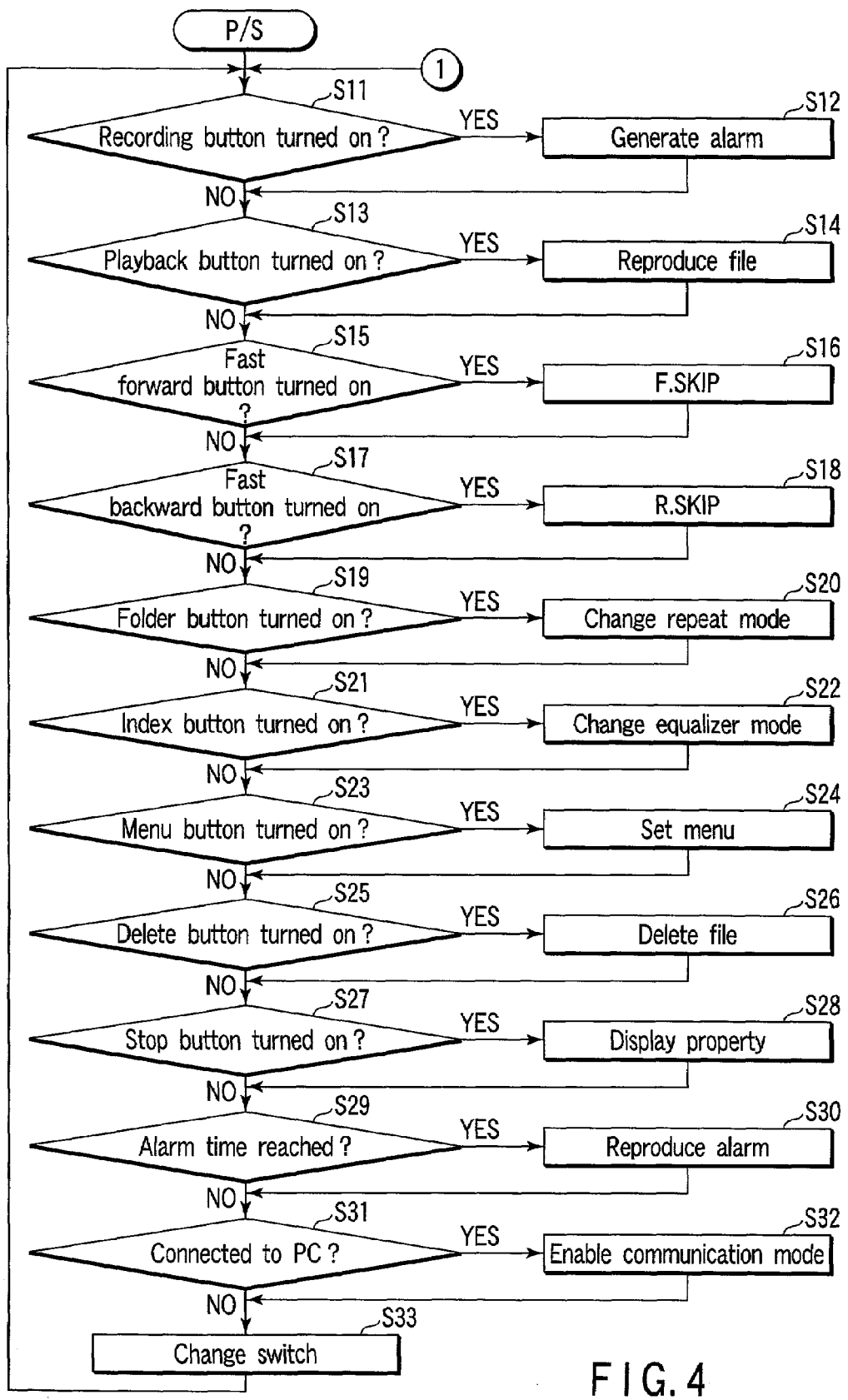
FIG. 4 is a flowchart which shows a process when an operation mode is set to player mode and the memory card 46 is mounted on the voice recording/reproducing apparatus body (P/S)

FIG. 4 is a flowchart which shows a process when the operation mode is set to the player mode and the memory card 46 is mounted on the voice recording/reproducing apparatus body (P/S).

At step S11, it is determined whether or not a recording button (not shown) is turned on. Since the player mode cannot record a voice, the process proceeds to step S12 to issue a warning.

When the recording button is not turned on at step S11, the process proceeds to step S13 to determine whether not a playback button is turned on. When the playback button is turned on, the process proceeds to step S14 to reproduce the current file.

When the playback button is not turned on at step S13, the process proceeds to step S15 to determine whether or not a fast forward button is turned on. When the fast forward button is turned on at step S15, the process proceeds to step S16 to perform a forward skip operation (F.SKIP). This operation increments a data file number by one to move a file to be reproduced or edited.

When the fast forward button is not turned on at step S15, the process proceeds to step S17 to determine whether or not the fast backward button is turned on. When the fast backward button is turned on at step S17, a reverse skip operation (R.SKIP) is performed. This operation decrements the data file number by one to move a file to be reproduced or edited.

When the fast backward button is not turned on at step S17, the process proceeds to step S19 to determine whether or not a folder/repeat button (not shown) is turned on. In the player mode, the folder/repeat button functions as a repeat mode changeover button. Accordingly, when the folder/repeat button is turned on, the process proceeds to step S20.

Each time the folder/repeat button is turned on at step S20, the repeat mode cyclically changes to normal playback mode, single-song repeat playback mode, all-song repeat playback mode, random playback repeat mode, random playback mode, and then back to normal playback mode.

When the folder/repeat button is not turned on at step S19, the process proceeds to step S21 to determine whether or not an index/equalizer button (not shown) is turned on. The index/equalizer button functions as an equalizer (frequency characteristics) changeover button. Each time the index/equalizer button is turned on at step S22, the equalizer mode cyclically changes to normal, pops, jazz, classic, user-defined, and then back to normal.

When the index/equalizer button is not turned on at step S21, the process proceeds to step S23 to determine whether or not a menu button (not shown) is turned on. When the menu button is turned on, the process proceeds to step S24 to perform a player menu setup process which configures various settings for the player mode.

When the menu button is not turned on at step S23, the process proceeds to step S25 to determine whether or not a delete button (not shown) is turned on. When the erase button is turned on, the process proceeds to step S26. At step S26, a specified file is deleted from the memory card 46. The file deletion process is applicable to files that are contained in the memory card 46 and are reproducible in the player mode.

When the delete button is not turned on at step S25, the process proceeds to step S27 to determine whether or not a stop button is turned on. When the stop button is turned on at step S27, the process proceeds to step S28 to display properties. Specifically, the display section 52 displays the encoding algorithm and the bit rate of a current file only while the stop button is turned on. When the operation stops, the display section 52 displays the playback number and the current position of the file.

When the stop button is not turned on at step S27, the process proceeds to step S29 to determine whether or not an alarm reproduction time is reached. When it is determined that the alarm reproduction time is reached, the process proceeds to step S30 to reproduce the alarm.

When it is determined at step S29 that the alarm reproduction time is not reached, the process proceeds to step S31. At step S31, it is determined whether or not the voice recording/reproducing apparatus is connected to the personal computer (PC) as an external device via the USB cable. When it is determined that the voice recording/reproducing apparatus is connected to the personal computer, the process proceeds to step S32 to enter a communication mode with the personal computer (to be described).

When it is determined at step S31 that the voice recording/reproducing apparatus is not connected to the personal computer, the process proceeds to step S33 to perform a switch changeover process. The process detects the state of the operation mode switch, and then proceeds to the P/NC, R/S, or R/NC process according to the detected state and whether or not the memory card 46 is mounted on the apparatus. When no change is made to the operation mode switch etc., the process returns to step S11.

Figure 5:
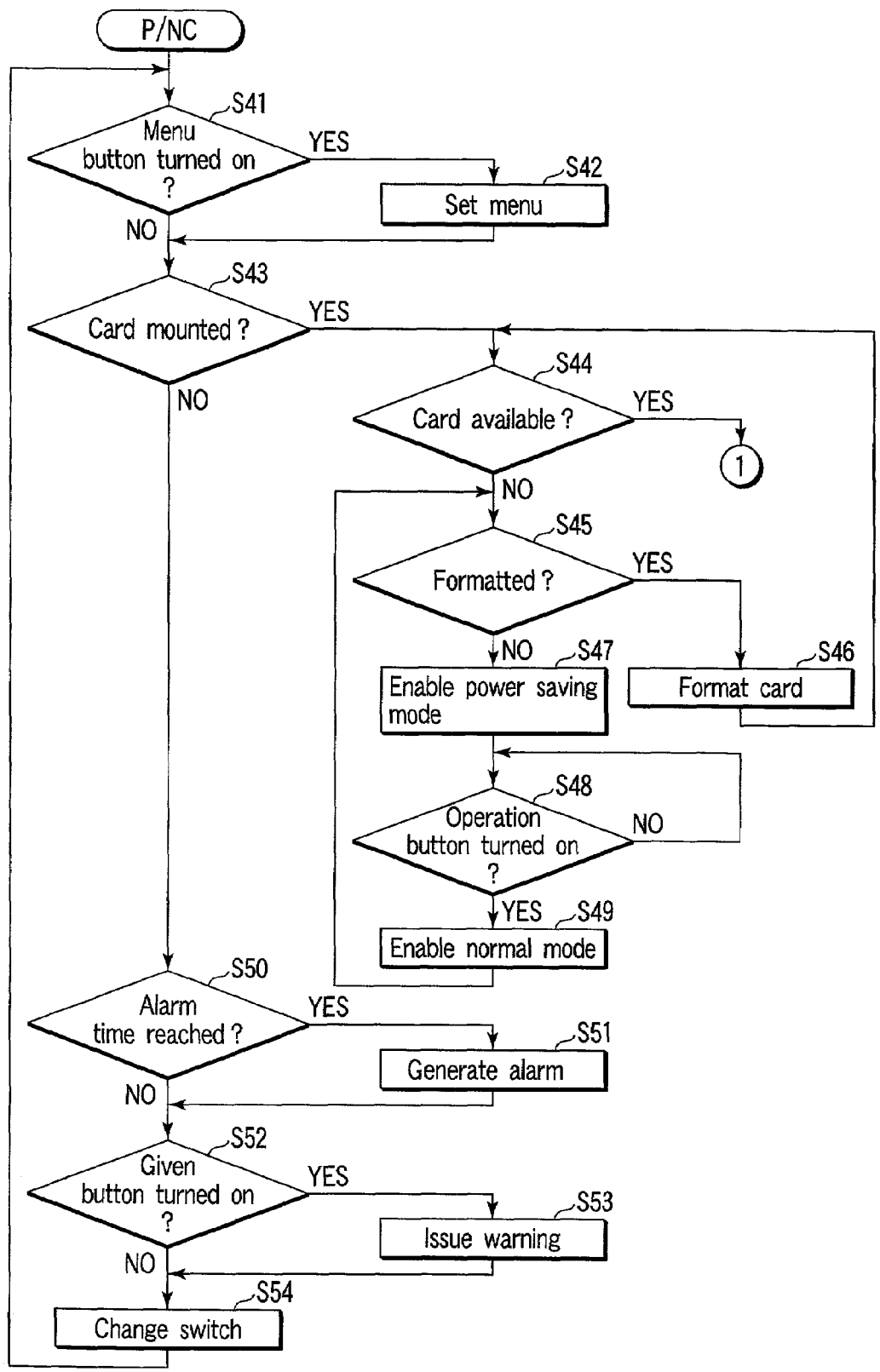
FIG. 5 is a flowchart which shows a process when an operation mode is set to player mode and the memory card 46 is not mounted on the voice recording/reproducing apparatus body.

FIG. 5 is a flowchart which shows a process when the operation mode is set to the player mode and the memory card 46 is not mounted on the voice recording/reproducing apparatus body.

At step S41, it is determined whether or not the menu button is turned on. When the menu button is turned on, the process proceeds to step S42 to perform the player menu process. Since the memory card 46 is not mounted on the apparatus, however, the process disables selection of items for setting the memory card such as write protection, memory card formatting, etc.

When the menu button is not turned on at step S41, the process proceeds to step S43 to determine whether or not the memory card 46 is mounted on the apparatus. When the memory card 46 is mounted on the apparatus at step S43, the process proceeds to step S44 to determine whether or not the memory card 46 is available.

When it is determined at step S44 that the memory card 46 is available, the P/S process is performed (step S11 of the flowchart in FIG. 4). When it is determined at step S44 that the memory card 46 is unavailable because the memory card 46 is not formatted (initialized) normally, for example, the process proceeds to step S45.

At step S45, a user determines whether or not to format the memory card 46. When the user selects to format the card, the process proceeds to step S46 to format the memory card 46, and then returns to step S44. When the user selects not to format the card at step S45, the process proceeds to step S47.

At step S47, the operation mode of the CPU 40 changes to power saving mode to turn off indications. At step S48, the CPU 40 waits until any operation button is turned on.

When any operation button is turned on, the process changes the operation mode of the CPU 40 to the normal mode at step S49, and then returns to step S45. When the unavailable memory card 46 is mounted on the apparatus, the card must be formatted for normal operations of recording and reproducing a voice.

When the mounting of the memory card 46 is not detected at step S43, the process proceeds to step S50 to determine whether or not an alarm time is reached. When the alarm time is reached, there is no voice file to be reproduced because the memory card 46 is not installed on the apparatus. The process proceeds to step S51, displays an indication notifying that the alarm time is reached, and then just generates an alarm sound. When the alarm is sounding, turning on any operation button stops the alarm from sounding.

When it is determined that the alarm time is not reached at step S50, the process proceeds to step S52. It is then determined whether or not action is taken to turn on a given button such as the recording button, the playback button, the delete button, etc. whose operation is meaningless when the memory card 46 is not mounted on the apparatus.

When the given button is turned on at step S52, the process proceeds to step S53 to generate a warning sound from the speaker 38. When it is determined that the given button is not turned on, the process proceeds to step S54 to perform the switch changeover process, the process returns to step S41.

Figure 6:
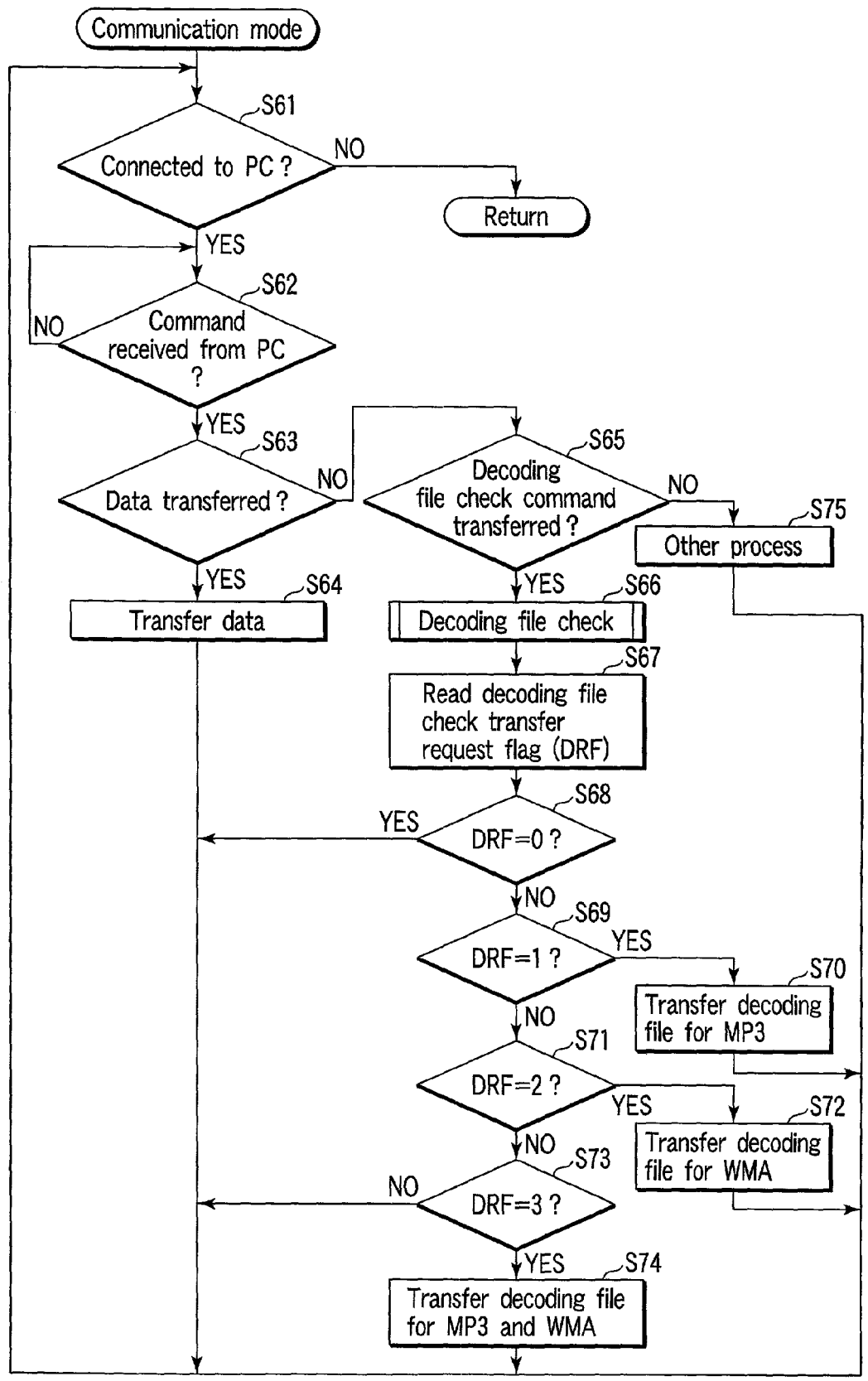
FIG. 6 is a subroutine which shows a communication mode process at step S32 of the flowchart in FIG. 4.

FIG. 6 is a subroutine which shows a communication mode process at step S32 of the flowchart in FIG. 4.

When the communication mode is enabled, it is determined at step S61 whether or not the voice recording/reproducing apparatus is connected to the personal computer (PC). When the apparatus is disconnected from the personal computer, the process exits the routine and returns to the original point. Otherwise, it is determined at step S62 whether or not a transfer command is received from the personal computer.

When that command is received, it is determined at step S63 whether or not data is to be transferred. When it is determined that data is to be transferred from the personal computer, the process proceeds to step S64 to transfer the data.

When it is determined at step S63 that data is not to be transferred from the personal computer, the process proceeds to step S65 and determines whether or not a decoding file check command is transferred. When it is determined that the decoding file check command is not transferred, the process proceeds to step S75 for other processes, and then returns to step S61. When it is determined at step S65 that the decoding file check command is transferred, the process proceeds to step S66 to execute a decoding file check subroutine as will be described later in detail.

At step S67, a decoding file check transfer request flag (DRF) is read. The DRF=0 indicates that no decoding file is requested. The DRF=1 indicates that a decoding file for MP3 is requested. The DRF=2 indicates that a decoding file for WMA is requested. The DRF=3 indicates that the decoding file for MP3 and WMA is requested.

At step S68, it is determined whether or not the DRF is set to "0". When the flag is set to "0", the process returns to step S61. When the flag is not set to "0", the process proceeds to step S69 to determine whether or not the DRF is set to "1".

When it is determined at step S69 that the DRF is set to "1", the process proceeds to step S70 to transfer the decoding file for MP3. The process returns to step S61.

When it is determined at step S69 that the DRF is not set to "1", the process proceeds to step S71 to determine whether or not the DRF is set to "2". When it is determined that the DRF is set to "2", the process proceeds to step S72 to transfer the decoding file for WMA. The process returns to step S61 thereafter.

When it is determined at step S71 that the DRF is not set to "2", the process proceeds to step S73 to determine whether or not the DRF is set to "3". When it is determined that the DRF is set to "3", the process proceeds to step S74 to transfer the decoding file for MP3 and WMA. The process returns to step S61 thereafter. When it is determined at step S73 that the DRF is not set to "3", the process returns to step S61.

Figure 7:
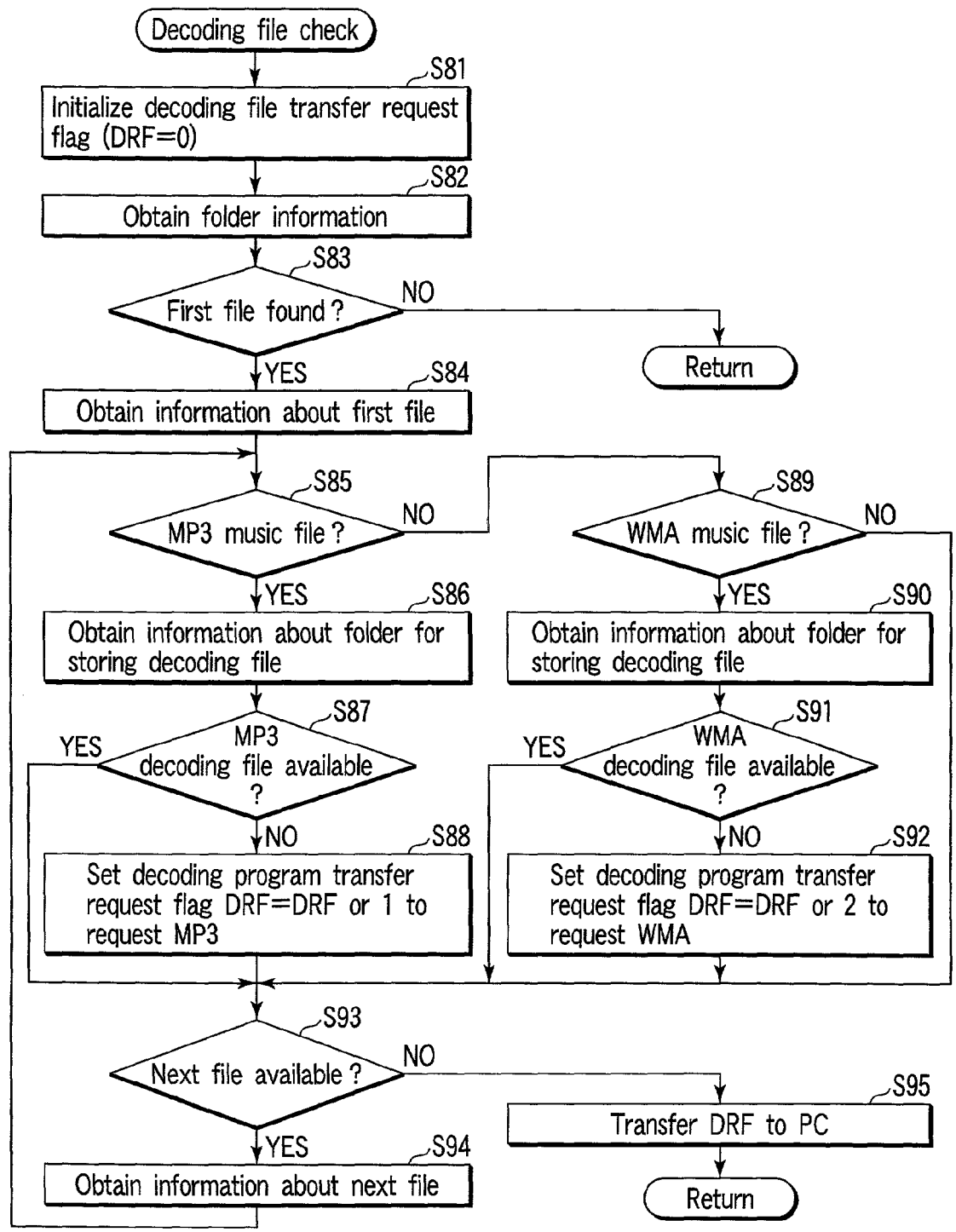
FIG. 7 is a subroutine which shows a decoding file check process of the flowchart in FIG. 6.

Referring now to FIG. 7, the following describes a decoding file check process of the flowchart in FIG. 6.

When entering the decoding file check routine, the process initializes the decoding file transfer request flag (DRF=0) at step S81. The DRF is composed of two bits. At step S82, the process obtains information about a specified folder in the memory card 46. In this embodiment, the root directory is specified.

At step S83, it is determined whether or not the obtained folder contains the first music file. When the first music file is unavailable, the routine is exited. When the first music file is available, the process proceeds to step S84 to obtain the information about that file to be inspected.

At step S85, it is determined whether or not the obtained file under inspection is an MP3 music file.

As a result of step S85, when the file under inspection is an MP3 music file, the process proceeds to step S86. Otherwise, the process proceeds to step S89.

At step S86, information about the system folder 80 is obtained. At step S87, it is determined whether or not the obtained folder contains an MP3 decoding file.

The flag FMP indicates whether or not the system folder 80 contains an MP3 decoding file. When such file exists, the flag FMP3 is set to "1". It is possible to determine whether or not the system folder 80 contains the decoding file by checking the flag FMP3's value.

When no MP3 decoding file is available, the process proceeds to step S88 to set a decoding program transfer request flag. In this case, "1" is set to the lower significant position of the DRF to request an MP3 decoding file. After this flag is set, or when the MP3 decoding file is found at step S87, the process proceeds to step S93.

At step S89, it is determined whether or not the obtained file under inspection is a WMA music file.

As a result of step S89, when the file under inspection is a WMA music file and the system folder 80 does not contain a decoding file for decoding the WMA music file, the process proceeds to step S90. Otherwise, the process proceeds to step S93.

At step S90, information about the system folder 80 is obtained. At step S91, it is determined whether or not the obtained folder contains an WMA decoding file.

The flag FWMA indicates whether or not the system folder 80 contains a WMA decoding file. When such file exists, the flag FWMA is set to "1". It is possible to determine whether or not the system folder 80 contains the decoding file by checking the flag FWMA's value.

When a WMA decoding file is available, the process proceeds to step S93; otherwise to S92. The decoding program transfer request flag is set. In this case, "1" is set to the upper significant position of the DRF to request a WMA decoding file. After this flag is set, the process proceeds to step S93.

At step S93, it is determined whether or not the next music file is available. When the next music file is available, the process proceeds to step S94 to obtain the information about that file. The process then returns to step S85. When the next music file is unavailable at step S93, the process proceeds to step S95 to transfer the current decoding file transfer request flag (DRF) to the personal computer. Thereafter, the routine is exited.

Figure 8:
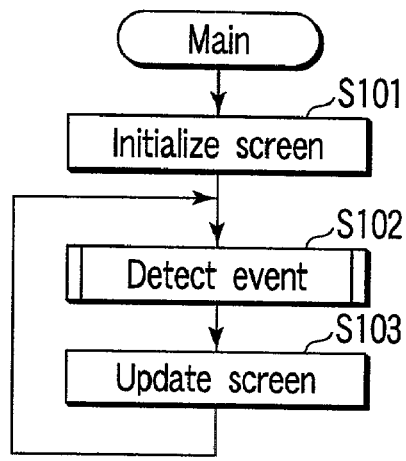
FIG. 8 is a flowchart which shows a main operation of a personal computer to transfer a music file to the voice recording/reproducing apparatus.
Figure 9:
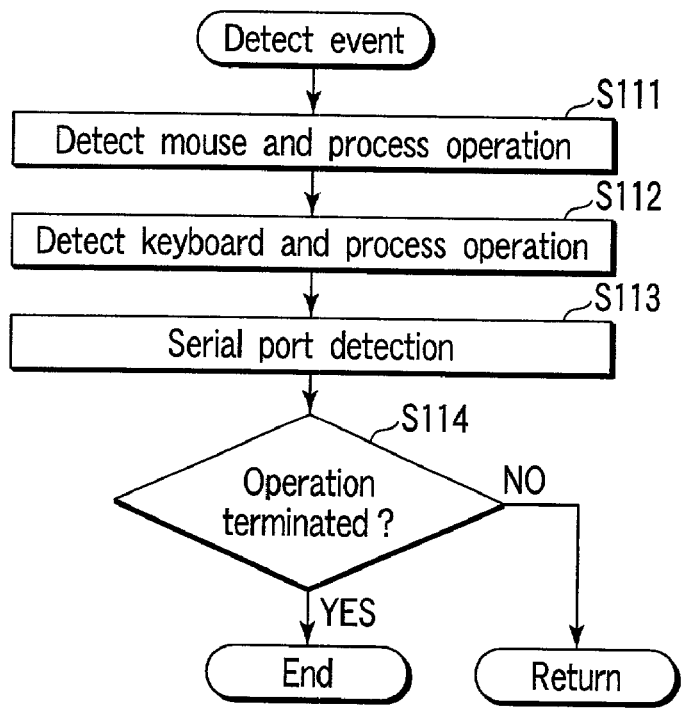
FIG. 9 is a subroutine which shows an event detection process at step S102 of the flowchart in FIG. 8.
Figure 10:
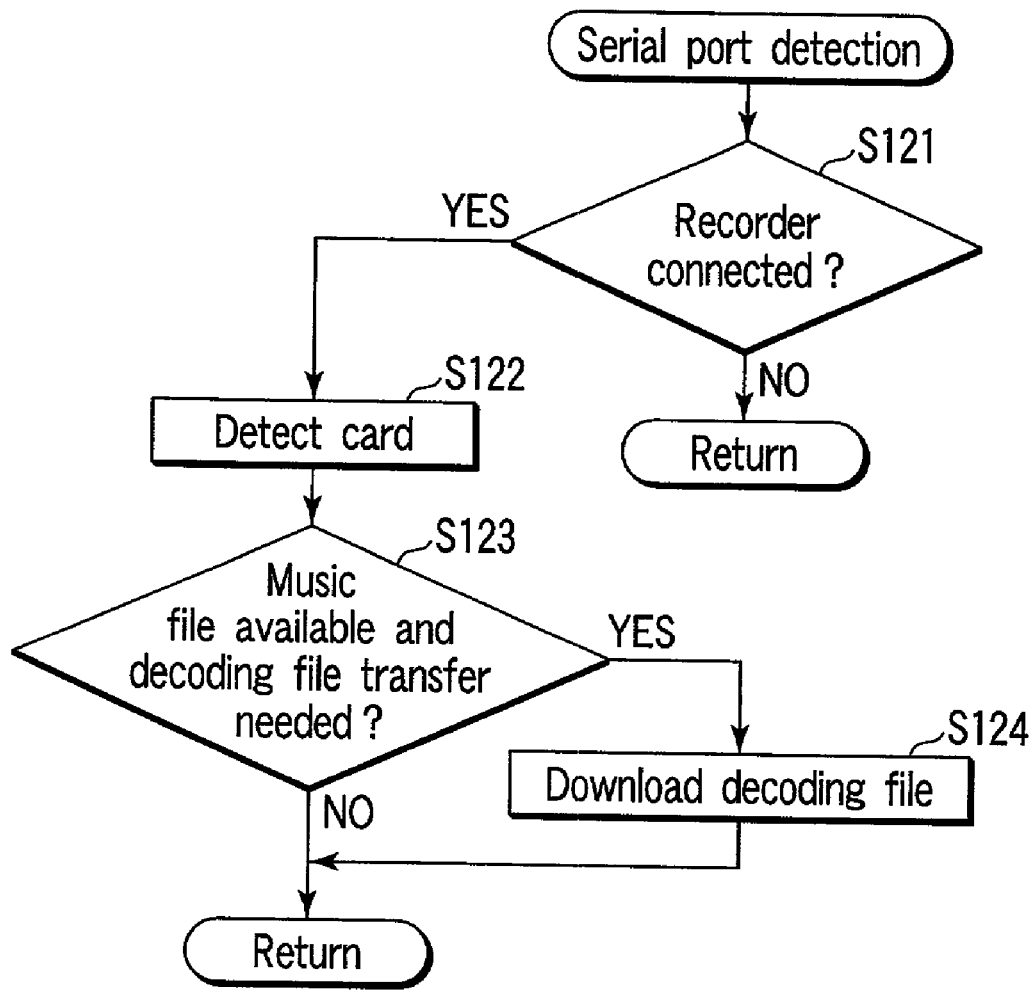
FIG. 10 is a subroutine which shows a serial port detection process at step S113 of the flowchart in FIG. 9.

Referring now to flowcharts in FIGS. 8 through 10, the following describes operations of the personal computer which transfers a music file to the voice recording/reproducing apparatus.

FIG. 8 is a flowchart which shows a main operation of the personal computer.

At step S101, the screen is initialized. At step S102, various events are detected (to be described). When the screen is updated at step S103, the process returns to step S103, the process returns to step S102.

FIG. 9 is a subroutine which shows the event detection at step S102 of the flowchart in FIG. 8. When entering the event detection subroutine, the process detects a mouse (pointing device) and processes operations at step S111. At step S112, the process detects a keyboard and processes operations. At step S113, a serial port is detected.

At step S114, it is determined whether or not the operation due to the event terminates. When the operation terminates, the main operation terminates. Otherwise, the routine is exited.

FIG. 10 is a subroutine which shows the serial port detection at step S113 of the flowchart in FIG. 9.

When the subroutine is entered, it is determined at step S121 whether or not a recorder (the voice recording/reproducing apparatus in this case) is connected to the personal computer. When no recorder is connected, the routine is exited. When it is determined that the recorder is connected, the process proceeds to step S122 to detect a card. During the card detection, it is determined whether or not the memory card 46 is mounted on the recorder. Further, it is determined whether or not the memory card 46 records a music file and a decoding file for decoding the music file.

At step S123, it is determined whether or not the detected memory 46 card contains a music file and the decoding file needs to be transferred. When the decoding file need not be transferred, the routine is exited. When the decoding file needs to be transferred at step S123, the process proceeds to step S124. At step S124, the decoding file is downloaded. The routine is exited.

Figure 11:
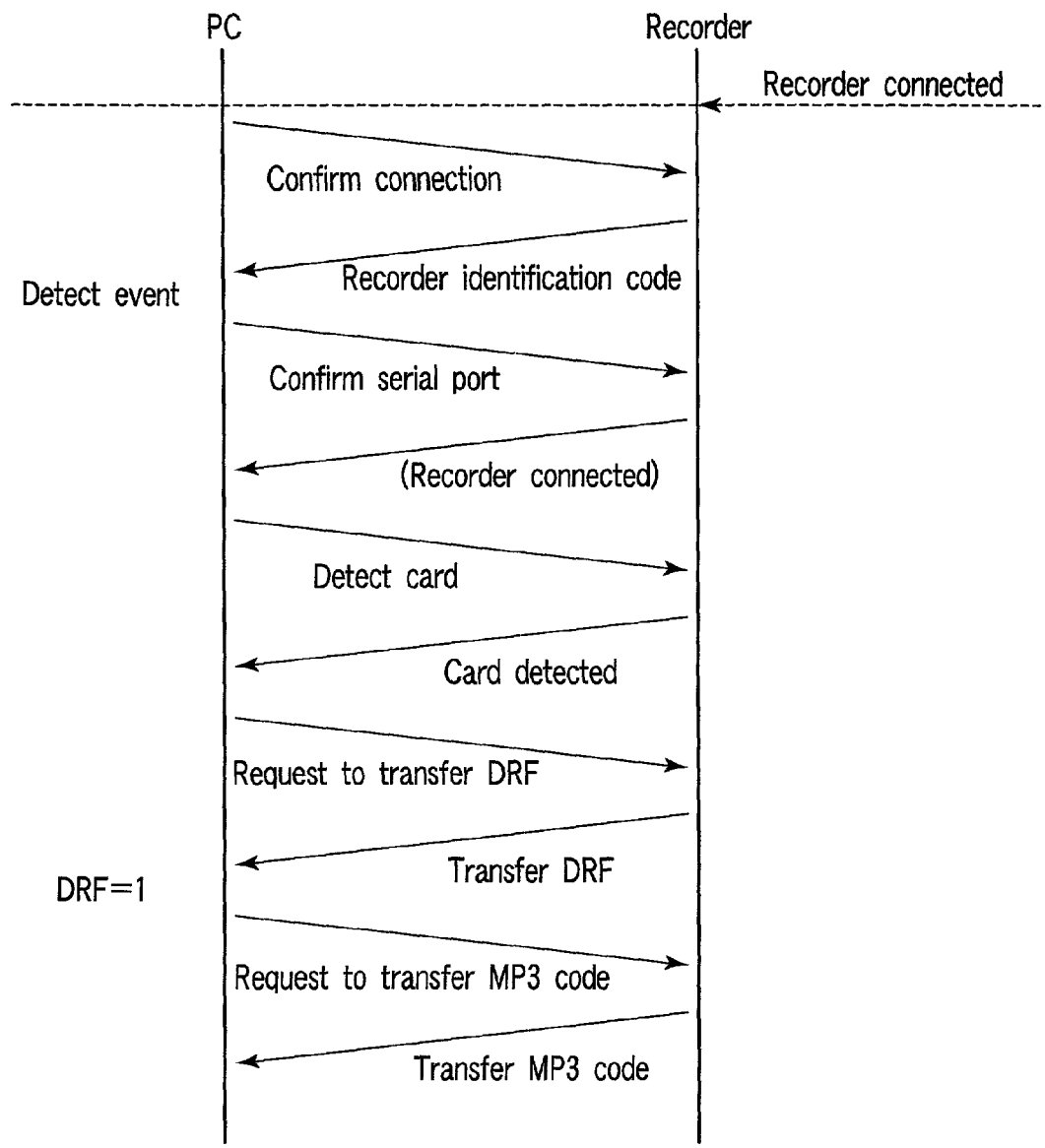
FIG. 11 illustrates data transfer between a recorder (voice recording/reproducing apparatus) and a personal computer (PC)

Referring now to FIG. 11, the following describes a flow of interchanging data between the recorder (voice recording/reproducing apparatus) and the personal computer for transferring a music file.

First, the personal computer checks a connection state whether or not the recorder is connected to the personal computer. When the recorder sends a recorder identification code to the personal computer, the event detection process is executed (see the flowchart in FIG. 9).

Here, the personal computer confirms the serial port. When it is confirmed that the recorder is connected, the card (memory card) detection process is executed (see step S122 of the flowchart in FIG. 10). When the card is mounted on the recorder, availability of the card is sent to the personal computer.

The personal computer requests the recorder to transfer the decoding file check transfer request flag (DRF). In response to this, the recorder transfers the decoding file check transfer request flag to the personal computer.

When the flag is transferred to the personal computer, it sends a request to transfer a music file, or the MP3 code in this case, to the recorder. In response to the code transfer request, the recorder transfers the MP3 code to the personal computer.

The following describes a second embodiment of the present invention.

The second embodiment explains another example of a process when the operation mode is set to player mode and the memory card 46 is not mounted on the voice recording/reproducing apparatus.

The second embodiment uses the same configuration of the voice recording/reproducing apparatus as the first embodiment. A description of the configuration is omitted.

Figure 12A:
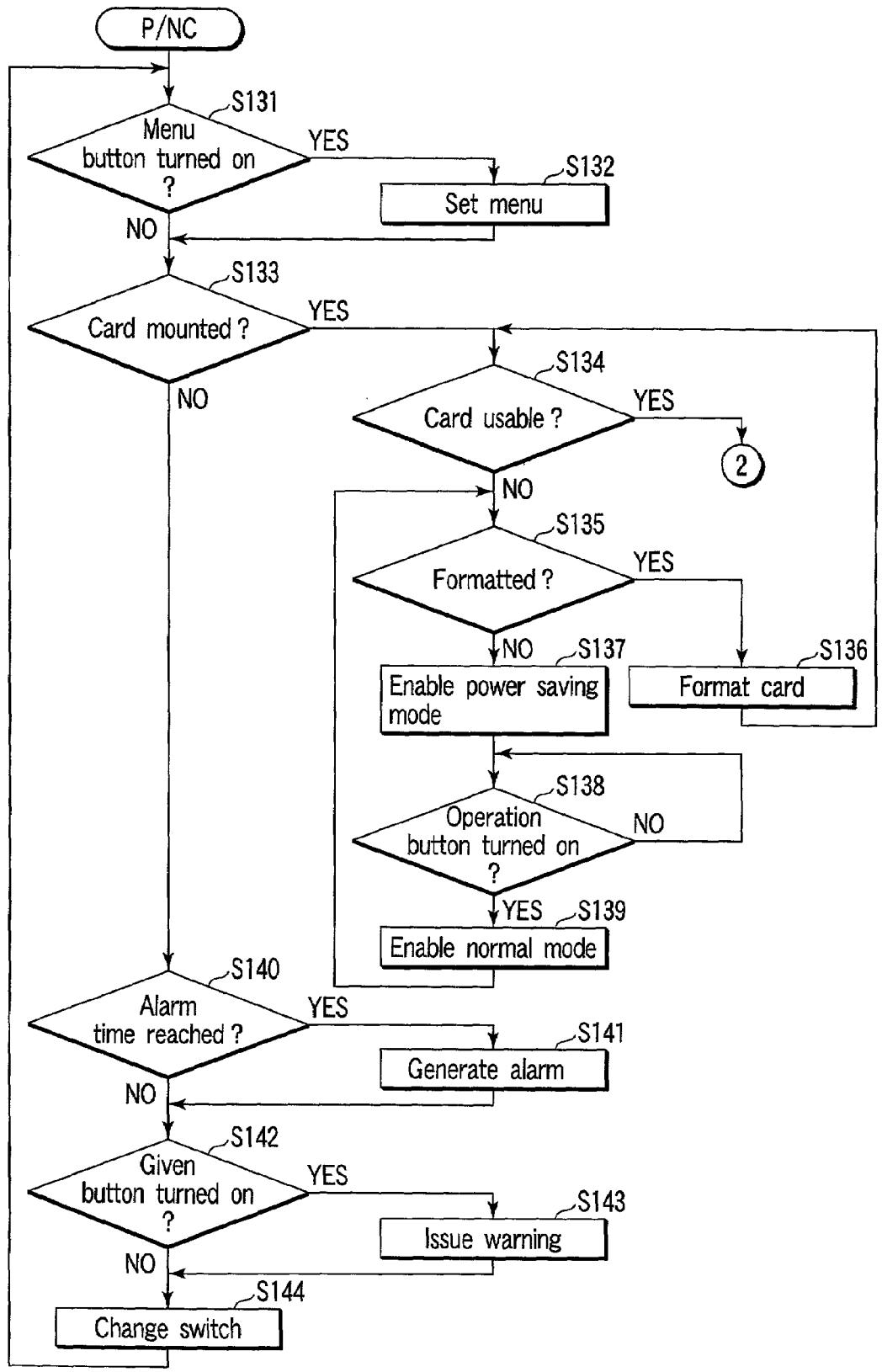
FIGS. 12A and 12B provide a flowchart which shows an operation of a voice recording/reproducing apparatus according to a second embodiment of the present invention, explaining another example of a process when an operation mode is set to player mode and the memory card 46 is not mounted on the voice recording/reproducing apparatus body.
Figure 12B:
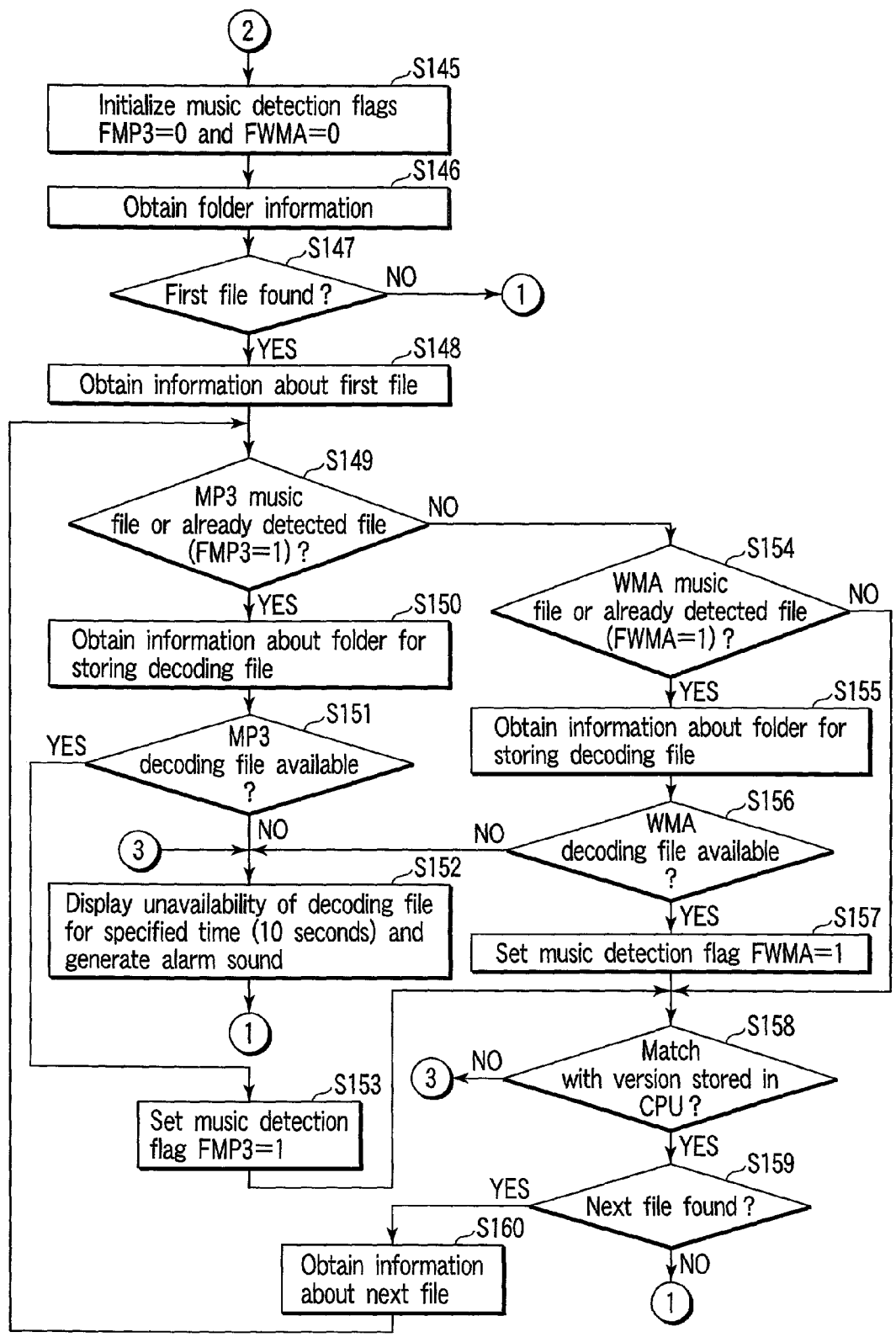

FIGS. 12A and 12B provide a flowchart which shows another example of a process when the operation mode is set to player mode and the memory card 46 is not mounted on the voice recording/reproducing apparatus body.

Operations at steps S131 through S133 and steps S135 through S144 in this flowchart are the same as those at steps S41 through S43 and steps S45 through S54 of the flowchart in FIG. 5. A description the corresponding operations is omitted.

When it is determined at step S134 that the memory card 46 is unusable, the process proceeds to step S135. A user specifies whether or not to format the memory card 46. When it is determined at step S134 that the memory card 46 is usable, the process proceeds to step S145.

At step S145, a music detection flag is initialized. The MP3 flag FMP3 and the WMA flag FWMA are each reset to "0". At step S146, the process obtains information about a specified folder in the memory card 46. According to the embodiment, the root directory is specified.

At step S147, it is determined whether or not the obtained folder contains the first music file. When the music file is unavailable, the process proceeds to the P/S process (step S11 of the flowchart in FIG. 4). When the music file is available, the process proceeds to step S148 to obtain the file information about a first music file under inspection.

At step S149, it is determined whether or not the obtained file under inspection is an MP3 music file. Further, it is determined whether or not a specified location, i.e., the system folder 80 contains a decoding file for decoding an MP3 music file.

As a result, when the file under inspection is an MP3 music file and the system folder 80 does not contain a decoding file for decoding the MP3 music file, the process proceeds to step S150. Otherwise, the process proceeds to step S154.

At step S150, information about the system folder 80 is obtained. At step S151, it is determined whether or not the obtained folder contains an MP3 decoding file.

When no MP3 decoding file is available, the process proceeds to step S152. The display section 52 displays for a specified time (e.g., 10 seconds) that the decoding file is unavailable. An alarm sound is generated as a warning via the speaker 38. Thereafter, the process proceeds to the P/S process (step S11 of the flowchart in FIG. 4).

When the MP3 decoding file is available at step S151, process proceeds to step S153 to set the flag FMP3 to "1". This flag indicates that an MP3 decoding file is detected. The process then proceeds to step S158.

At step S154, it is determined whether or not the obtained file under inspection is a WMA music file. Further, it is determined whether or not a specified location, i.e., the system folder 80 contains a decoding file for decoding a WMA music file. As a result, when the file under inspection is a WMA music file and the system folder 80 does not contain a decoding file for decoding the WMA music file, the process proceeds to step S155. Otherwise, the process proceeds to step S158.

At step S155, information about the system folder 80 is obtained. At step S156, it is determined whether or not the obtained folder contains a WMA decoding file.

When no WMA decoding file is available, the process proceeds to step S152. The display section 52 displays for a specified time (e.g., 10 seconds) that the decoding file is unavailable. An alarm sound is generated as a warning via the speaker 38. Thereafter, the process proceeds to the P/S process (step S11 of the flowchart in FIG. 4).

When the WMA decoding file is available at step S156, the process proceeds to step S157 to set the flag FWMA to "1". This flag indicates that a WMA decoding file is detected. The process then proceeds to step S158.

At step S158, it is determined whether or not the version stored in the CPU 40 matches the decoding file version stored in the memory card 46.

Referring now to FIGS. 13A and 13B, the following describes decoding file management specifications.

When there is no match in version between the CPU's firmware and the decoding file, the performance cannot be ensured. The decoding file contains header information from the first address (address 0) to a location less than address 60 for encrypting the DSP's decoding program. The header information contains an identification, a relevant product, version information, a creator (company), etc.

As shown in FIG. 13A, for example, a decoding file 110 comprises a header 110*a* and a music decoding program 110*b*. The header 110*a*, as shown in FIG. 13B, comprises a plurality of items.

During checking, the CPU first reads item 1. When item 1 contains "0×0000", the CPU reads item 2. When item 2 also contains "0×0000", the CPU reads item 3, and so on. According to the specification, the CPU need not confirm item 4 and later.

At step S158, when the version stored in the CPU 40 differs from the decoding file version stored in the memory card 46, the process proceeds to step S152. When both versions match, the process proceeds to step S159 to determine whether or not the next file is available.

When the next file is available, the process proceeds to step S160 to obtain the information about that file. The process then returns to step S149.

When the next file is unavailable, the process proceeds to the P/S process (step S11 of the flowchart in FIG. 4).

While the first and the second embodiments have explained only two examples, i.e., the MP3 and the WMA encoding techniques, the present invention is not limited thereto. For example, it may be preferable to use the encoding such as AAC, TwinVQ, etc.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A data reproducing apparatus comprising:
a recording medium whose recording contents can be rewritten by an external device, wherein said recording medium is configured to be attachable to and detachable from the data reproducing apparatus;
a compression system detection section which detects a compression system for compressed data, wherein said compressed data is recorded on said recording medium;
a decoding file detection section which detects whether or not said recording medium records a decoding file corresponding to said detected compression system;
a storage section which, when said decoding file is not detected, stores data indicating the undetected decoding file; and
a connection section which connects with the external device, wherein the data stored in said storage section is transferred through the connection section in response to connection with the external device.

2. The data reproducing apparatus according to claim 1, wherein:
said decoding file detection section performs said detection in response to an operation of installing said recording medium on said data reproducing apparatus.

3. The data reproducing apparatus according to claim 2, further comprising:
a warning section which generates an alarm when said decoding file is not detected.

4. The data reproducing apparatus according to claim 3, wherein said compression system detection section detects a compression system based on a file extension of said compressed data or based on data recorded in a file header of said compressed data.

5. The data reproducing apparatus according to claim 1 further comprising:
a control section which provides control to record a decoding file transferred from said external device on said recording medium in response to connection with said external device and based on said data stored in said storage section.

6. A data reproducing system including a data reproducing apparatus and a data processing apparatus, wherein said data reproducing apparatus comprises:
a recording medium whose recording contents can be rewritten by an external device, said recording medium being configured to be attachable to and detachable from the data reproducing apparatus;
a compression system detection section which detects a compression system for compressed data, said compressed data being recorded on said recording medium;
a decoding file detection section which detects whether or not said recording medium records a decoding file corresponding to said detected compression system;
a storage section which, when said decoding file is not detected, stores data indicating the undetected decoding file;
a connection section which connects with said external device; and
a first control section which provides control to transfer the data stored in said storage section to said external device through the connection section and to record a decoding file transferred from said external device on said recording medium
and wherein said data processing apparatus is capable of sending and receiving data from a data reproducing apparatus which reproduces compressed data recorded on a recording medium by using a corresponding decoding file, said data processing apparatus comprising:
a detection section which detects connection of said data reproducing apparatus;
an information acquisition section which obtains information about a decoding file needed to reproduce said compressed data from said data reproducing apparatus in response to connection with said data reproducing apparatus;
a transmission section which transmits a necessary decoding file based on said obtained information to said data reproducing apparatus; and
a second control section which controls sand data reproducing apparatus so as to record a decoding file transmitted by said transmission section on said recording medium.

* * * * *